US012345229B1

(12) United States Patent
Grace

(10) Patent No.: US 12,345,229 B1
(45) Date of Patent: Jul. 1, 2025

(54) WATER TREATMENT SYSTEM POWER GENERATION

(71) Applicant: Don Grace, Ocala, FL (US)

(72) Inventor: Don Grace, Ocala, FL (US)

( * ) Notice: Subject to any disclaimer, the term of this patent is extended or adjusted under 35 U.S.C. 154(b) by 0 days.

(21) Appl. No.: 18/773,932

(22) Filed: Jul. 16, 2024

(51) Int. Cl.
*F03B 17/06* (2006.01)
*F03B 11/00* (2006.01)

(52) U.S. Cl.
CPC ............ *F03B 17/06* (2013.01); *F03B 11/004* (2013.01); *F05B 2210/11* (2013.01); *F05B 2220/20* (2013.01)

(58) Field of Classification Search
CPC .... F03B 17/06; F03B 11/004; F05B 2210/11; F05B 2220/20
See application file for complete search history.

(56) References Cited

U.S. PATENT DOCUMENTS

| | | | | | |
|---|---|---|---|---|---|
| 716,650 | A * | 12/1902 | Besse | F03B 13/00 | 415/75 |
| 1,010,609 | A * | 12/1911 | Fountain | E02B 9/00 | 405/75 |
| 2,276,714 | A * | 3/1942 | Brown | F01D 1/026 | 415/214.1 |
| 2,436,683 | A * | 2/1948 | Wood, Jr. | H02K 5/128 | 290/43 |
| 2,481,222 | A * | 9/1949 | Jones | H02K 7/1823 | 290/2 |
| 3,750,001 | A * | 7/1973 | McCloskey | G05D 22/02 | 290/43 |
| 4,272,686 | A * | 6/1981 | Suzuki | F03B 17/062 | 290/43 |
| 4,352,025 | A * | 9/1982 | Troyen | F03B 13/00 | 415/145 |
| 4,381,645 | A * | 5/1983 | Galuska | F03B 13/086 | 137/151 |
| 4,408,127 | A * | 10/1983 | Santos, Sr. | F03B 17/005 | 290/43 |
| 5,007,241 | A * | 4/1991 | Saitou | F04D 25/02 | 415/62 |

(Continued)

FOREIGN PATENT DOCUMENTS

| | | | | |
|---|---|---|---|---|
| WO | WO-2022093528 A1 * | 5/2022 | F03B 13/00 |
| WO | WO-2022093528 A9 * | 4/2023 | F03B 13/00 |
| WO | WO-2024205707 A1 * | 10/2024 | F01D 15/10 |

*Primary Examiner* — Pedro J Cuevas

(57) ABSTRACT

A power generation device configured to be operably coupled to a plumbing component for a water treatment system wherein the present invention is operable to provide electrical current to a power component of the water treatment system. The present invention includes a housing having a wall defining the interior volume thereof. The housing includes an inlet opening and an outlet opening located on opposing sides of the housing. Disposed within the interior volume of the housing is a first valve and a second valve. The first valve is a pressure reducing valve and the second valve is a bypass valve. A power generation member is disposed within the interior volume and is fluidly coupled with the first valve that provides operation thereof through control of water flow direction within the housing. The second valve provides water flow through the housing providing a mode without power generation by the present invention.

14 Claims, 2 Drawing Sheets

(56) References Cited

U.S. PATENT DOCUMENTS

| | | | | |
|---|---|---|---|---|
| 6,765,308 | B1 * | 7/2004 | Kazanjian | F03B 13/00 290/43 |
| 7,357,599 | B2 * | 4/2008 | Cripps | E03F 3/02 290/1 R |
| 7,466,035 | B1 * | 12/2008 | Srybnik | F03B 17/063 290/43 |
| 7,508,318 | B2 * | 3/2009 | Casella | G01F 25/10 705/412 |
| 7,564,144 | B1 * | 7/2009 | Srybnik | F03B 13/10 290/43 |
| 7,632,040 | B2 * | 12/2009 | Cripps | F03B 7/00 290/1 R |
| 7,768,146 | B2 * | 8/2010 | Balzano | F03B 13/00 290/43 |
| 7,946,789 | B2 * | 5/2011 | Cripps | F03B 7/00 290/1 R |
| 8,002,499 | B2 * | 8/2011 | Cripps | F03B 13/00 290/43 |
| 8,092,675 | B2 * | 1/2012 | Kennedy | E04H 4/12 204/194 |
| 8,147,167 | B2 * | 4/2012 | Cripps | F03B 13/00 290/1 R |
| 8,147,168 | B2 * | 4/2012 | Cripps | F03B 13/00 290/43 |
| 8,376,656 | B2 * | 2/2013 | Cripps | F03B 13/00 290/1 R |
| 8,550,746 | B2 * | 10/2013 | Cripps | F03B 7/00 290/1 R |
| 8,585,320 | B2 * | 11/2013 | Cripps | F03B 13/00 290/1 R |
| 8,794,873 | B2 * | 8/2014 | Cripps | F03B 13/08 210/162 |
| 8,946,921 | B2 * | 2/2015 | Kaiser | H02K 7/1823 290/43 |
| 9,157,411 | B2 * | 10/2015 | Cripps | F03B 7/00 |
| 9,163,421 | B2 * | 10/2015 | Van Der Meijden | E04H 4/1672 |
| 9,243,604 | B2 * | 1/2016 | Montgomery | F03B 13/00 |
| 9,593,664 | B2 * | 3/2017 | Cripps | F03B 13/10 |
| 9,863,396 | B2 * | 1/2018 | Oncale | F03B 11/004 |
| 10,819,186 | B2 * | 10/2020 | Conness | H02K 11/0094 |
| 11,946,604 | B2 * | 4/2024 | Semler | F03B 13/08 |
| 12,258,868 | B2 * | 3/2025 | Connor, Jr. | F01D 21/14 |
| 2006/0245467 | A1 * | 11/2006 | Casella | H04Q 9/00 374/41 |
| 2008/0169654 | A1 * | 7/2008 | Omer | F03B 17/065 290/4 R |
| 2012/0086204 | A1 * | 4/2012 | Re | F03B 13/00 290/43 |
| 2012/0274066 | A1 * | 11/2012 | Montgomery | F03B 13/00 415/220 |
| 2013/0092126 | A1 * | 4/2013 | Leone | F02D 9/1055 123/399 |
| 2014/0265328 | A1 * | 9/2014 | Van Blerk | F03B 11/004 290/43 |
| 2021/0310221 | A1 * | 10/2021 | Semler | H02K 7/1823 |
| 2022/0128044 | A1 * | 4/2022 | Semler | F03B 13/00 |
| 2024/0142064 | A1 * | 5/2024 | Semler | F17D 5/00 |
| 2024/0328326 | A1 * | 10/2024 | Connor, Jr. | F01D 21/14 |

* cited by examiner

WATER TREATMENT SYSTEM POWER GENERATION

FIELD OF THE INVENTION

The present invention relates generally to electrical power generation, more specifically but not by way of limitation, a device configured to be operably coupled to a plumbing component for a water treatment system wherein the present invention includes a pressure reducing valve operable to redirect a portion of the water flowing through the device of the present invention so as to operably engage a generator disposed within the device of the present invention.

BACKGROUND

Commercial and residential structures often employ various types of water management and plumbing systems. In addition to the conventional plumbing for the structures, systems such as but not limited to irrigation systems and water treatment systems are often installed in both commercial and residential structures. By way of example but not limitation, water treatment systems typically provide filtration and softening of the water prior to the water entering the plumbing system of the structure. Conventional system will utilize salt and various filtration techniques to provide an improved quality of water to the structure. The water filtration systems are typically mounted adjacent the exterior of the structure and employ additional elements such as but not limited to controllers to provide operation of the system.

The controllers for water treatment systems and other similar plumbing systems require electrical power for operation thereof. Many models of controllers utilize batteries to provide the necessary power for operation of the controller. It is common to install a solar powered battery charger to supply electrical current to the power source disposed within the controller to ensure continuous operation thereof. While somewhat effective, the installation of a photovoltaic panel can be challenging in some locations where water treatment systems are installed. Another issue with solar charging of the batteries for the controller of a water treatment system is consistency. Solar power is dependent upon sufficient exposure to sunlight and this has proven to be difficult in certain geographic areas and where the water treatment system must be installed.

Accordingly, there is a need for a power generation device that is integrated into the flow path of a water treatment system wherein the present invention utilizes the water flow of the water treatment system to generate electrical power sufficient to charge the battery of a controller for a water management system such as but not limited to a water treatment system.

SUMMARY OF THE INVENTION

It is the object of the present invention to provide a power generation device operable to provide power for a controller for a water treatment system wherein the present invention includes a housing having an outer wall wherein the outer wall defines an interior volume of the housing.

Another object of the present invention is to provide a device configured to be installed in the plumbing of a water management system wherein the housing has disposed therein a pressure reducing valve.

A further object of the present invention is to provide a power generation device operable to provide power for a controller for a water treatment system wherein the housing includes an inlet on a first side of the housing and an outlet on the second side of the housing.

Yet a further object of the present invention is to provide a device configured to be installed in the plumbing of a water management system wherein the housing has disposed therein a bypass valve.

Still another object of the present invention is to provide a power generation device operable to provide power for a controller for a water treatment system wherein the pressure reducing valve and bypass valve are fluidly coupled having a wall member therebetween.

An additional object of the present invention is to provide a device configured to be installed in the plumbing of a water management system wherein the housing has disposed in the interior volume thereof a power generation member.

Yet a further object of the present invention is to provide a power generation device operable to provide power for a controller for a water treatment system wherein the power generation member is fluidly coupled to a channel having a first opening and a second opening.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
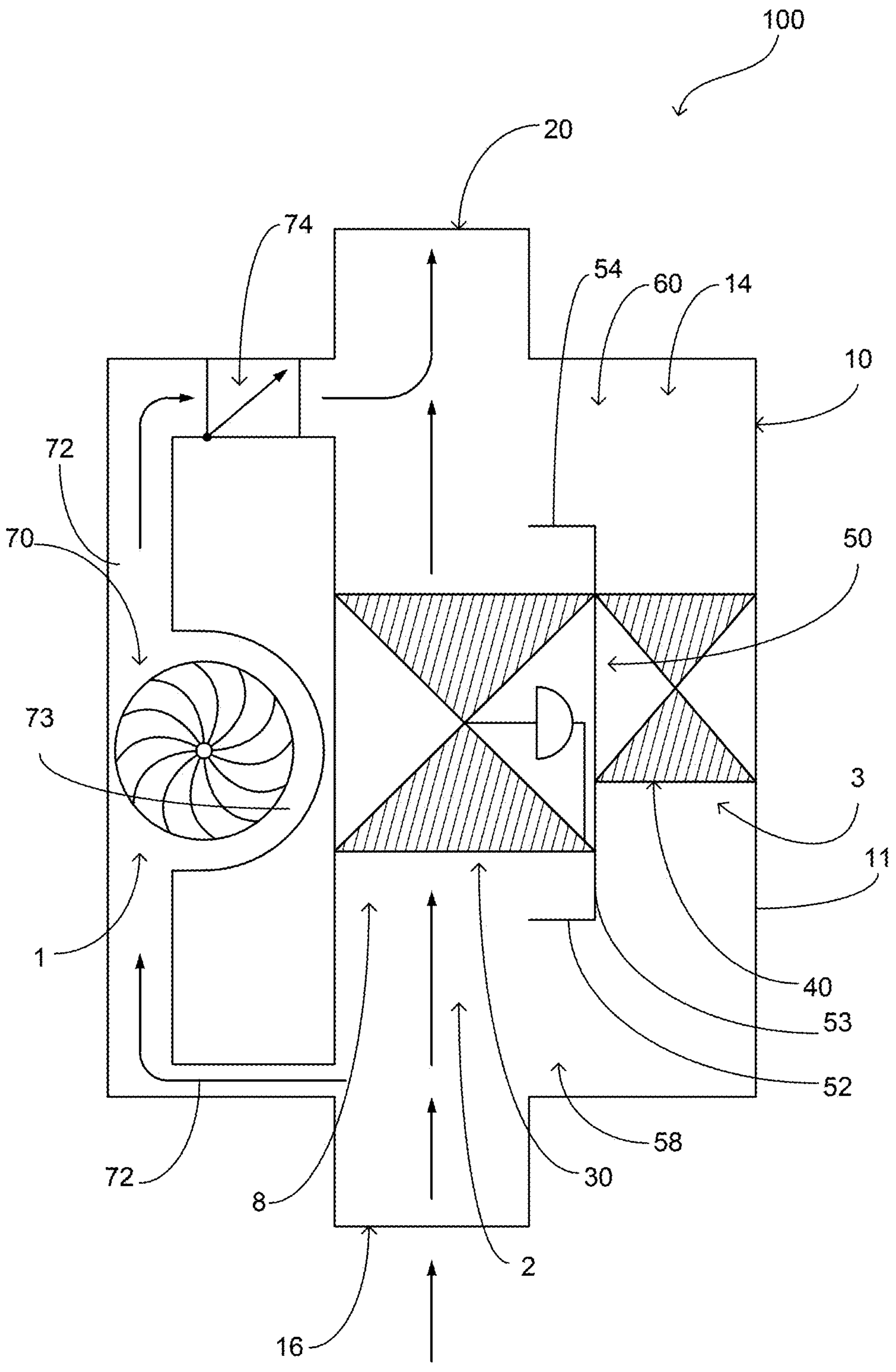
FIG. 1 is a diagrammatic view of the present invention.

Referring now to the drawings submitted herewith, wherein various elements depicted therein are not necessarily drawn to scale and wherein through the views and figures like elements are referenced with identical reference numerals, there is illustrated a power generation device 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the power generation device 100 is configured to be operably coupled to a conventional plumbing pipe present in either a commercial or residential plumbing system. It should be understood within the scope of the present invention that the power generation device 100 could be installed on various diameters of plumbing pipe utilizing suitable techniques.

The power generation device 100 includes a housing 10 having and exterior wall 11 manufactured from a suitable durable material. The exterior wall 11 defines the size of the interior volume 14 of the housing 10 as well as the shape thereof. It should be understood within the scope of the present invention that the housing 10 could be provided in alternate shapes and sizes. The housing 10 has integrally formed proximate the bottom thereof an inlet opening 16. Inlet opening 16 is fluidly coupled to a water pipe and facilitates the introduction of a water flow into the interior volume 14 of the housing 10. Formed on the opposing top end of the housing 10 is the outlet opening 20. Outlet opening 20 is fluidly coupled to a pipe of a plumbing system to which the power generation device 100 is operably coupled and facilitates the exit of the water flow from the housing 10 into the plumbing system to which the power generation device 100 is operably coupled.

Disposed within the interior volume 14 of the housing 10 is a first valve 30 and a second valve 40. The first valve 30 and second valve 40 are adjacent each other mounted on opposing sides of wall member 50. Wall member 50 includes a center section 53 that is parallel with wall 11 of the housing 10. Contiguously formed with the center section 53 are end sections 52,54 wherein the end sections 52,54 are distally located on the center section 53 and perpendicular therewith. End sections 52,54 extend inward into the interior volume 14 of the housing 10. End section 52 creates lower internal passage 58 that facilitates water flow into the second valve 40. End section 54 in conjunction with wall 11 facilitates passage 60 wherein passage 60 facilitates the ability to water to flow outward from the second valve 40 when the second valve 40 is in the open position. While the wall member 50 has been illustrated and discussed having a particular form herein, it is contemplated within the scope of the present invention that the wall member 50 could be formed in alternate shapes and sizes in order to achieve the desired objective discussed herein.

Disposed within the interior volume 14 is a power generation member 70. Power generation member 70 is fluidly coupled to water passage 72 wherein water passage 72 further includes recess 73 forming sufficient space for power generation member 70. As is further discussed herein, as water flows through the water passage 72, power generation member 70 rotatably moves in order to generate an electrical current which is transferred via conventional electrical wires to a power source providing charging thereof (not particularly illustrated herein). In a preferred embodiment of the power generation member 70, the power generation member 70 is a turbine rotatably mounted within the water passage 72. Water passage 72 has installed therein a check valve 74, wherein the check valve 74 is conventional check valve operating between a closed and open position so as to facilitate water flow through the water passage 72. While one power generation member 70 is discussed and illustrated herein, it is contemplated within the scope of the present invention that the power generation device 100 could employ more than one power generation member 70.

The first valve 30 of the power generation device 100 is a pressure reducing valve. The first valve 30 is configured to regulate the flow and pressure through the center portion 8 of the interior volume 14 so as to direct a portion of the water flow entering the inlet opening 16 into the water passage 72 so as to provide operation of the power generation member 70. As is known in the art, pressure reducing valves provide operation between a fully closed and open position so as to provide restriction of flow therethrough. The first valve 30 is operably controlled to provide restriction of water flow in order to direct water flow into the water passage as determined by the electrical need from the power generation member 70. It should be understood within the scope of the present invention that the first valve 30 could be operated in numerous alternate positions providing flow control through the water passage 72.

Second valve 40 is provided and operates as a bypass valve. Second valve 40 is operated in either a closed position or an open position. In its closed position water flow is inhibited from passing thereby. In its closed position water flow through the power generation device 100 is controlled by first valve 30. In its open position, the second valve 40 permits water to flow therethrough and as such water flowing through the housing 10 will bypass the first valve 30. The second valve 40 is placed in its open position in events such as but not limited to increased flowrate demand and failure of components of the power generation device 100.

Figure 2:
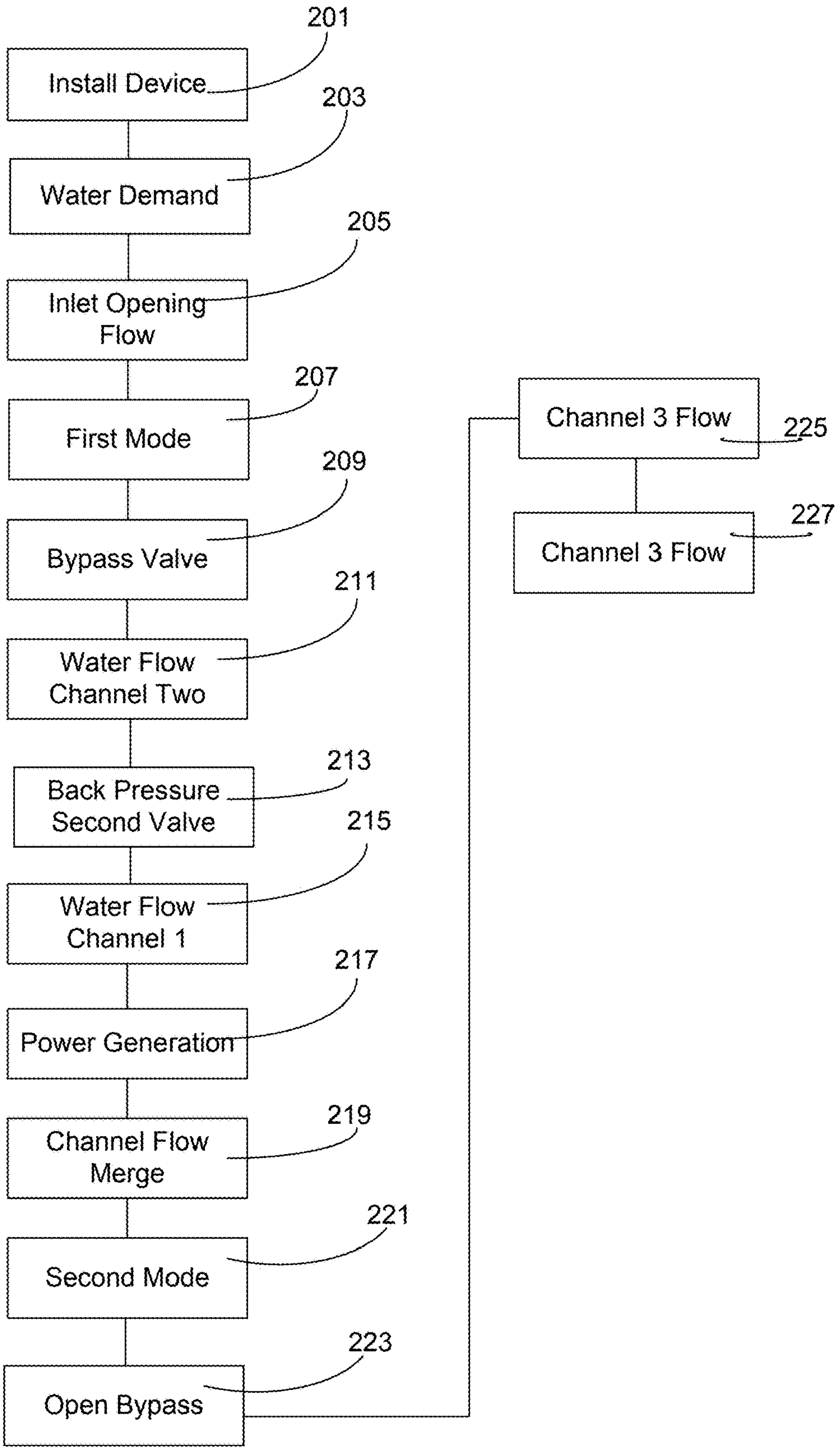
FIG. 2 is a flowchart of an exemplary method of operation of the present invention.

Referring in particular to FIG. 2, an exemplary method of operation of the power generation device 100 is diagrammed therein. In step 201, the power generation device 100 is operably coupled to a pipe of a plumbing system for a commercial or residential structure. Step 203, a demand for water is placed upon the plumbing system from at least one fixture operably coupled to the plumbing system. In step 205, water flows into the housing 10 via the inlet opening 16. Step 207, the power generation device 100 is placed in its first mode of operation. In step 209, in the first mode of operation of the power generation device 100 the second valve 40 is placed in its closed position. In its closed position, water flow is inhibited from flowing through the third water channel past the second valve resulting in water flow being directed into the second water channel 2. In step 211, water enters the second channel 2 and fluidly engages the first valve 30. Step 213, the first valve 30 as discussed herein is a back pressure regulator valve wherein the second valve 30 is adjusted so as to inhibit all of the water flow from egressing through the second water channel 2. The back-pressure from the second valve 30 directs water into the first water channel 1. In step 215, water begins to flow through the first water channel 1. Step 217, the power generation member 70 begins operation resulting from the engagement with water flowing through the first water channel 1 wherein rotation of the power generation member 70 provides generation of electrical power which is transferred via suitable techniques to components such as but not limited to power supplies for plumbing system components. In step 219, water flow from the first water channel 1 and second water channel 2 merge to egress from the housing 10 via outlet opening 20.

In step 221, the power generation device 100 is placed in its second mode. Step 223, in its second mode the power generation device 100 inhibits water flow through the first water channel 1 and second water channel 2 by placing the second valve 40 in an open position. In step 225 water entering the inlet opening 16 flows through the third water channel 3 and ins tep 227 egresses the outlet opening 20. It should be understood within the scope of the present invention that the power generation device 100 is operated in either the first mode or second mode and wherein the control thereof can be automatic or manual.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A power generation device configured to be operably coupled to a pipe of a plumbing system wherein the power generation device comprises:

a housing, said housing having an exterior wall defining a shape thereof and an interior volume, said housing having a first end and a second end, said housing having an inlet opening proximate said first end thereof, said housing having an outlet opening proximate said second end thereof, said housing having a first water channel, a second water channel and a third water channel disposed in the interior volume of said housing, said first water channel, second water channel and third water channel being fluidly coupled to said inlet opening, said first water channel, second water channel and third water channel being fluidly coupled to said outlet opening;

a first valve, said first valve being disposed in said second water channel, said first valve configured to restrict water flow through said second water channel;

a second valve, said second valve being disposed in said third water channel, said second valve having an open position and a closed position;

a power generation member, said power generation member being disposed in said first water channel, said power generation member configured to generate an electrical current; and wherein said first valve is configured to produce a back-pressure of water flow in said second water channel so as to direct water flow into said first water channel and provide operation of said power generation member.

2. The power generation device configured to be operably coupled to a pipe of a plumbing system as recited in claim 1, wherein the power generation device is operable in a first mode and a second mode.

3. The power generation device configured to be operably coupled to a pipe of a plumbing system as recited in claim 2, wherein in said first mode said second valve is in a closed position and said first valve is configured to inhibit at least a portion of water flow available therethrough.

4. The power generation device configured to be operably coupled to a pipe of a plumbing system as recited in claim 3, wherein in said second mode said second valve is in the open position facilitating flow of water from said inlet opening to said outlet opening through said third water channel.

5. The power generation device configured to be operably coupled to a pipe of a plumbing system as recited in claim 4, wherein said second valve is a bypass valve.

6. The power generation device configured to be operably coupled to a pipe of a plumbing system as recited in claim 5, wherein said first valve is a back pressure regulator valve.

7. The power generation device configured to be operably coupled to a pipe of a plumbing system as recited in claim 6, wherein said power generation member is a rotatably mounted turbine wheel.

8. The power generation device configured to be operably coupled to a pipe of a plumbing system as recited in claim 7, wherein said first water channel further includes a recess, said power generation member being partially mounted within said recess.

9. The power generation device configured to be operably coupled to a pipe of a plumbing system as recited in claim 8, wherein the housing further includes a wall member mounted in the interior volume thereof, said wall member having a center section and distally located end sections, said distally located end section being perpendicular to said center section, said distally located end sections oriented inwards towards said second water channel.

10. The power generation device configured to be operably coupled to a pipe of a plumbing system as recited in claim 9, wherein said first valve and said second valve are located on opposing sides of said wall member.

11. A method of generating an electrical current to be supplied to a power source for a water treatment apparatus for a plumbing system wherein the method comprises the steps of:

installing a power generation device, said power generation device having a housing, said housing having an exterior wall defining a shape thereof and an interior volume, said housing having a first end and a second end, said housing having an inlet opening proximate said first end thereof, said housing having an outlet opening proximate said second end thereof, said housing having a first water channel, a second water channel and a third water channel disposed in the interior volume of said housing, said first water channel, second water channel and third water channel being fluidly coupled to said inlet opening, said first water channel, second water channel and third water channel being fluidly coupled to said outlet opening;

a first valve, said first valve being disposed in said second water channel, said first valve configured to restrict water flow through said second water channel, said housing having disposed therein a power generation member, said power generation member being disposed in said first water channel, said power generation member configured to generate an electrical current;

receiving a water demand from the plumbing system, wherein at least one fixture places a demand for water on the plumbing system;

directing water flow through the inlet opening of said housing, wherein the water flow enters the interior volume of said housing;

placing the power generation device in a first mode, wherein in said first mode said second valve is in a closed position so as to direct water flow into the second water channel;

applying a backpressure to the water flow in said second water channel so as to direct water flow into said first water channel;

generating electrical current from said power generation member, said power generation member configured to rotatably move from said water flow in said first channel;

directing said electrical current to the power source for the water treatment apparatus;

directing the water flow from said first water channel and said second water channel outward from said outlet opening of said housing.

12. The method of generating an electrical current to be supplied to the power source for the water treatment apparatus for the plumbing system as recited in claim 11, and further including a step of placing the power generation device in a second mode, wherein in said mode said second valve is in an open position.

13. The method of generating an electrical current to be supplied to the power source for the water treatment apparatus for the plumbing system as recited in claim 12, wherein in said second mode waterflow entering the inlet opening is directed through said third water channel.

14. The method of generating an electrical current to be supplied to the power source for the water treatment apparatus for the plumbing system as recited in claim 13, wherein in said second mode said first valve is in a closed position.

* * * * *